United States Patent [19]

Margalit

[11] 4,113,929

[45] Sep. 12, 1978

[54] NON-AQUEOUS PRIMARY BATTERY HAVING A PURE SILVER CHROMATE CATHODE

[75] Inventor: Nehemiah Margalit, Levittown, Pa.

[73] Assignee: ESB Incorporated, Philadelphia, Pa.

[21] Appl. No.: 851,414

[22] Filed: Nov. 14, 1977

[51] Int. Cl.² ............................................. H01M 6/14
[52] U.S. Cl. ..................................... 429/194; 429/219
[58] Field of Search ............... 429/194, 196, 197, 199, 429/219

[56] References Cited

U.S. PATENT DOCUMENTS

| | | | |
|---|---|---|---|
| 3,658,592 | 4/1972 | Dey | 429/197 |
| 3,853,627 | 12/1974 | Lehmann et al. | 429/194 X |
| 3,918,988 | 11/1975 | Abens | 429/194 |

*Primary Examiner*—Charles F. Lefevour
*Attorney, Agent, or Firm*—G. W. Rudman; A. J. Rossi; G. V. Pack

[57] ABSTRACT

A non-aqueous primary battery having an electrolytic solution consisting essentially of a non-aqueous solvent containing an electrolyte salt, a separator, a light metal anode and a pure silver chromate cathode is provided. The electrochemical system of this battery is particularly useful in small primary batteries commonly referred to as "button cells" due to its high volumetric energy density and retention of cell dimensions.

8 Claims, 1 Drawing Figure

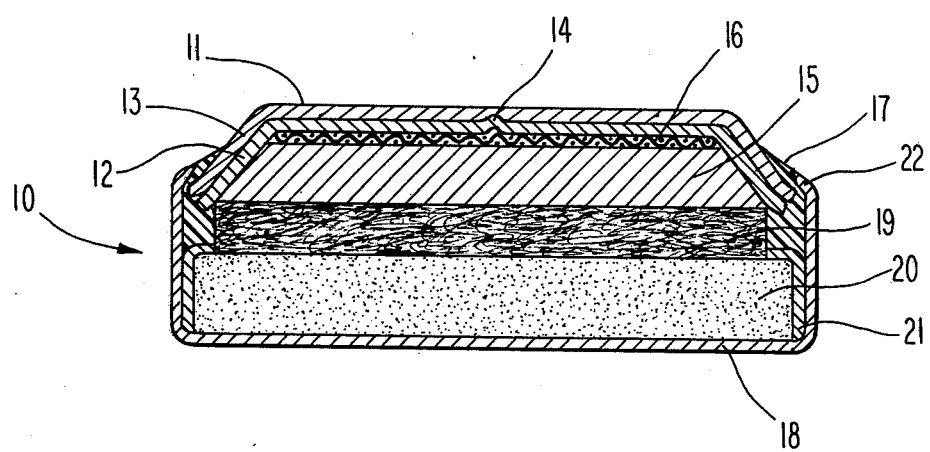

NON-AQUEOUS PRIMARY BATTERY HAVING A PURE SILVER CHROMATE CATHODE

BACKGROUND OF THE INVENTION

1. Field of the Invention

The invention relates to a high volumetric energy density battery having a light metal anode, a pure silver chromate cathode, and a non-aqueous electrolytic solution. The exothermic reactivity of the anode material with water requires the use of a non-aqueous organic solvent containing a dissolved salt as the electrolytic solution. The electrochemical systems provides a very high volumetric energy density and it is generally preferred to employ the system in small primary batteries. The invention is not limited to any particular battery size or construction nor is it limited to any particular anode material or non-aqueous electrolyte.

2. Description of the Prior Art

The prior art discloses many high energy density battery systems which employ a light metal anode in combination with a non-aqueous organic electrolyte solution. Of particular relevance are U.S. Pat. Nos. 3,658,592 issued to A. N. Dey and assigned to P. R. Mallory & Company, Inc. and 3,853,627, 3,871,915 and 3,970,475 all assigned to Societe des Accumulateurs Fixes et de Traction.

U.S. Pat. No. 3,658,592 discloses a high energy density organic electrolyte battery employing a light metal anode and a metal chromate cathode. The cathode contains a conductive ingredient such as graphite and a polymeric binder such as polytetrafluoroethylene mixed with the metal chromate active material. The cathode composition is molded onto an expanded molded current collector. The patent discloses that the lithium-silver chromate mix cell has a open circuit voltage and an average operating voltage of 3.4, presumably in an electrolyte solution comprising lithium perchlorate (LiClO$_4$) and tetrahydrofuran. (THF)

U.S. Pat. No. 3,853,627 issued to Gerard Lehmann and Jean-Paul Gabano discloses a high energy density system employing a lithium anode and a silver chromate/graphite cathode. The application states that a mixture of 99% silver chromate and 1% carbon black or any other material insuring a good electrical conductivity of the electrode can be used. The perferred electrolytic solution comprises lithium perchlorate dissolved in a solvent mixture such as tetrahydrofuran and dimethoxyethane. The cells have an average discarge voltage of 2.95 volts across a 9100 ohm resister and a 3.15 volt discharge across a 62000 ohm resister.

U.S. Pat. No. 3,871,915 issued to Alfred Brych discloses a high energy density lithium cell in which the cathode can be a silver chromate mix. The preferred electrolyte comprises lithium perchlorate dissolved in a solvent comprising a mixture of a cyclic ether (dioxolane) and a non saturated cyclic ester (vinylene carbonate). This cell of the example has a cathode mix of silver chromate/graphite/polytetrafluoroethylene and an 80% vinylene carbonate/20% dioxolane electrolytic solution with a lithium anode. The cell has a two voltage plateau discharge across a 300 ohm resister with a voltage plateau of 3 volts and 2.6 volts.

U.S. Pat. No. 3,970,475 issued to Gerard Gerbier and Jean-Paul Rivault discloses a high energy cell in which the positive active material is a mixture of silver chromate and silver powder. The silver powder is added in a proportion to comprise 5 to 30% by weight of the cathode. The patent teaches that since the silver powder is a conductor, it is possible to eliminate the carbon black.

The prior art teaches that silver chromate must be mixed with a conductive material to be utilizable as a cathode material.

It is the object of this invention to provide a high volumeric energy density non-aqueous primary battery having a pure silver chromate cathode. Another object is to provide a non-aqueous primary battery particularly of the button cell construction which does not bulge or expand excessively during discharge. A further object of the invention is to provide a non-aqueous button cell having a cathode material which does not contain a binder or a conductive ingredient such as graphite.

SUMMARY OF THE INVENTION

An improved battery has been made in which the battery is comprised of a light metal anode, a silver chromate cathode, a separator, an electrolytic solution of a non-aqueous solvent containing an electrolyte salt wherein the improvement is having the cathode material being formed of pure silver chromate.

BRIEF DESCRIPTION OF THE DRAWINGS

FIG. 1 is a cross-sectional view of a non-aqueous primary battery of this invention in a completed assembly condition.

DESCRIPTION OF THE PREFERRED EMBODIMENT

This invention comprises a non-aqueous primary battery having a pure silver chromate cathode, a light metal anode, a separator between the anode and cathode and a non-aqueous solvent containing a dissolved salt as electrolytic solution.

The light metal anode which may be used in the batteries of this invention are selected from lithium, magnesium, aluminum, beryllium, calcium, sodium and potassium. These metals may be used in their pure metallic state or they may be alloyed with each other or with other metals. For example, the metal can be amalgamated with mercury which reduces local action on the anode surface and thereby increases shelf life and storage capability. These metals may be used in sheet form or as powders either with or without plastic binders.

The non-aqueous electrolytic solution comprises an organic solvent and a metal salt dissolved therein. Organic solvents compatable with the light metal anodes and the cathode include tetrahydrofuran, methyl formate, methyl acetate, ethyl acetate, propylene carbonate, 1, 2, dimethoxyethane alone or mixed with tetrahydrofuran, dioxolene and substitutes thereof, gamma-butyrolactone and dimethyl carbonate. The solvents are merely representative and other organic solvents compatable with the light metal anode and the cathode may be used as well as mixtures of the solvents.

An inorganic salt of a light metal, preferably the same metal as the anode, is dissolved in the non-aqueous solvent to form the electrolytic solution. The inorganic salt is present to provide electrical conductivity to the non-aqueous solvent. The metal salts may be selected from perchlorates, hexafluoroarsenates, chloroaluminates, tetrafluoroborates and other salts soluble in the non-aqueous solvent and compatible with the anode and the cathode. The salts can range in concentrations up to saturation, however, preferred concentrations range between about 1 molar to about 3 molar. A preferred electrolytic solution is comprised of lithium hexafluoroarsenate ($LiAsF_6$) dissolved in methyl formate. Other preferred electrolytic solutions are comprised of lithium perchlorate ($LiClO_4$) or $LiAsF_6$ dissolved in propylene carbonate.

The cathode is comprised of pure silver chromate having no other ingredients except perhaps for impurities found in commercially available silver chromate. The cathodes experimentally tested have had porosities ranging from 4% to less than 1%. The porosity is determined by determining the apparent volume of the cathode from its dimensions and calculating the real volume of the active ingredients using the reported density. The difference between the apparent and the calculated volumes is divided by the apparent volume. This number multiplied by 100 is the percent porosity.

The light metal anode and the cathode must be separated by a separator material to prevent short circuits. It is generally preferred to use a glass mat material, with one or two layers of the glass mat being effective without unduly impairing the voltage. In some applications it may be desirable to use a special barrier material to stop silver migration such as cellophane, microporous polypropylene, microporous polytetrafluoroethylene and microporous polysulfide. If this special material is used in combination with a glass mat separators, it is generally preferred to place the glass mats next to the electrodes. However where only one glass mat is used, one should place the barrier next to the electrode material to which it is inert. For example, one would prefer to place a PFE separator next to the positive thus avoiding reduction by the anode.

Referring now to FIG. 1, a button cell construction 10 is illustrated, for button cells were selected to evaluate the non-aqueous primary battery system using the pure cathode. These button cells are the type currently used as a power source for electric watches, an application for which the high voltage non-aqueous primary batteries are particularly effective.

The anode container 11 comprises what is commonly referred to as a "double top." The two cans are placed in physical, electrical contact with each other with the inner can 12 being nestled in the outer can 13 to form a tight friction fit. It is generally preferred to spot weld the cans together as indicated at 14 to maintain permanent electrical contact. The cans may be made from stainless steel which has good corrosion resistance, however, other materials such as nickel plated steel may be used and the surfaces of the cans may be given special coatings. The "double top" container is preferred for its superior leakage prevention properties, however, a single container can be used and thereby provide more space for electrochemically active material. In order to insure good electrical contact between the inner can 12 and the light metal anode 15 during discharge, a nickel screen or expanded metal 16 may be welded to the can 12. A collar or grommet 17 of suitable plastic such as polyethylene is molded onto the edge of the double top to electrically insulate it from the cathode container 18. The light metal anode 15 may comprise any of the above listed materials but it is generally preferred to use lithium. The lithium pellet may be cut or punched from a lithium sheet having a thickness of 0.162 centimeters.

In the experimental work described in the examples, the separator 19 comprise two layers of 0.025–0.038 centimeter glass mat. One layer had a larger diameter (0.940 centimeters) and was placed against the cathode mix 20, with the edges folded inwardly against the grommet 17. The smaller (0.813 centimeter) diameter glass mat layer was placed inside the folded edge and in physical contact with other layer. When the electrolyte was added to these separator layers and the cell closed, it was difficult for materials such as silver to migrate around the edges of the swollen separator layers. The electrolyte volume was 0.10 cc, with 0.03 cc placed on the cathode pellet and 0.07 cc placed on the glass mat separator.

The cathode was formed by placing the silver chromate into a pelletizing dye. The silver chromate was compressed to form a cathode pellet, a force of about 1,000 kg was used to form the cathode pellet which had a height of 0.127 centimeter and a diameter of 1.02 centimeter. The cathode 20 was placed in the cathode container 18. A cathode mix ring 21 made from nickel plated steel, stainless steel, or metal may be placed around the cathode pellet. The anode container 11 and its components were assembled with the cathode container 18 and its components. The grommet 17 rests upon the cathode mix ring and the cell is sealed by compressing the upper edge 22 of the cathode container against the grommet 17 with the closing force of about 435 kg.

EXAMPLE 1

Button cells having a construction illustrated in FIG. 1 were made using various cathode materials. The anode was a lithium pellet having a 0.711 centimeter diameter and a 0.162 centimeter thickness and the electrolyte was a 2.0 molar solution $LiAsF_6$ in methyl formate. The "separator" was two layers of glass mat as described above. There were three different cathodes utilized in the cells and the different cells were discharged across a 15,000 ohm load at room temperature. The different cathodes were as follows:

Cells 1 & 2: A mix of 1% graphite and 99% silver chromate as disclosed by U.S. Pat. No. 3,853,627.
Cells 3 & 4: A mix of 5% silver powder and 95% silver chromate as disclosed by U.S. Pat. No. 3,970,475.
Cells 5 & 6: A pure silver chromate cathode having a porosity of about 2%.

The discharge behavior of these various cells is contained in the following table:

TABLE 1:

Discharge Behavior of Li/Pure $Ag_2CrO_4$ Cells Compared To Mixed $Ag_2CrO_4$ Cells
15000 ohm load, ambient temperature

| Cell # | Cathode Composition | Ave Voltage Volts | Capacity in Ahr | Energy in Whr | Utilization* % | Energy Density Whr/in₃ | Hours of Service | Cut-off** |
|---|---|---|---|---|---|---|---|---|
| 1 | $Ag_2CrO_4$ + 1% graphite | 2.95 | 85.2 | 251 | 94.4 | 10.0 | 434 | 2.72 |
| 2 | " | 2.96 | 89.7 | 265 | 98.0 | 10.6 | 455 | 2.65 |
| 3 | 95% $Ag_2CrO_4$ 5% silver | 2.90 | 83.9 | 244 | 89.5 | 9.7 | 434 | 2.71 |

TABLE 1:-continued
Discharge Behavior of Li/Pure Ag$_2$CrO$_4$ Cells Compared
To Mixed Ag$_2$CrO$_4$ Cells
15000 ohm load, ambient temperature

| Cell # | Cathode Composition | Ave Voltage Volts | Capacity in Ahr | Energy in Whr | Utilization* % | Energy Density Whr/in$_3$ | Hours of Service | Cut-off** |
|---|---|---|---|---|---|---|---|---|
| 4 | " | 2.89 | 82.3 | 238 | 88.7 | 9.5 | 427 | 2.71 |
| 5 | 100% Ag$_2$CrO$_4$ | 2.92 | 88.6 | 259 | 97.4 | 10.4 | 455 | 2.66 |
| 6 | " | 2.92 | 88.6 | 259 | 97.4 | 10.4 | 455 | 2.68 |

*of active cathode material based on the reaction
2Li + Ag$_2$CrO$_4$ → Li$_2$CrO$_4$ + 2Ag
**As readings were taken manually the closest readings to 2.7 volts were used for these calculations, readings were taken daily.

The table shows that higher capacity in hours of service were obtained for the pure silver chromate cathodes. Conductive material as disclosed by the prior art was not needed. It is clear that a pure silver chromate cell has the following advantages: (1) a cathode of pure silver chromate is the simpliest and least complex to produce and (2) the silver chromate cathode is safer than those having carbon or graphite added as the latter are flamable.

EXAMPLE 2

Pure silver chromate cathode primary batteries were made as in Example 1 except that the solvent for the electrolyte solution was propylene carbonate and some of the cells utilized lithium perchlorate as an inorganic salt. The concentration of both salts in their solutions was 1 mole per liter. These cells were discharged at 30.00 ohm load at ambient tempertures and the following results were obtained.

Table II
Discharge Behavior of Li/1M Salt in Propylene Carbonate/Pure Ag$_2$CrO$_4$ Cells
30,000 ohm Load, Ambient Temperature

| Cell | Salt | Avg. Voltage (Volts) | Hours of Service | Capacity (mAhr) | Energy (mWhr) | Energy Density (Whr/in$_3$) | Cut-Off* Voltage |
|---|---|---|---|---|---|---|---|
| 7 | LiClO$_4$ | 2.91 | 427 | 41.4 | 120 | 4.8 | 2.69 |
|   |   |   | 610 | 57.2 | 162 | 6.5 | 2.43 |
| 8 | " | 2.89 | 311 | 29.9 | 86.2 | 3.5 | 2.68 |
|   |   |   | 540 | 50.4 | 140 | 5.6 | 2.44 |
| 9 | " | 2.90 | 355 | 34.2 | 99.3 | 4.0 | 2.65 |
|   |   |   | 547 | 51.1 | 144 | 5.7 | 2.53 |
| 10 | LiAsF$_6$ | 2.86 | 571 | 54.5 | 156 | 6.2 | 2.69 |
|   |   |   | 796 | 73.7 | 206 | 8.2 | 2.41 |
| 11 | " | 2.89 | 547 | 52.6 | 152 | 6.0 | 2.70 |
|   |   |   | 796 | 73.9 | 207 | 8.3 | 2.41 |
| 12 | " | 2.88 | 547 | 52.5 | 151 | 6.1 | 2.72 |
|   |   |   | 763 | 71.2 | 200 | 8.0 | 2.43 |

*Cut-offs were chosen as 2.7 volts for end of the silver reduction plateau and 2.4 volts as the end of the chromate reduction plateau. As readings were taken manually the closest values to these cut-off voltages were used. Readings were taken daily.

I claim:
1. A non-aqueous primary battery having
   (a) a light metal anode selected from the group consisting of lithium, magnesium, aluminum, beryllium, calcium, sodium, and potassium;
   (b) an electrolyte solution comprised of an organic solvent and a light inorganic salt dissolved therein;
   (c) a separator; and
   (d) a cathode consisting of silver chromate without binder or conductive additives.
2. The battery of claim 1 in which the light metal anode is lithium.
3. The battery of claim 1 in which the non-aqueous solvent is propylene carbonate.
4. The battery of claim 3 in which the light metal inorganic salt is lithium perchlorate and the concentration of the salt in the electrolytic solution ranges from about 1 molar to about 3 molar.
5. The battery of claim 3 wherein the light metal inorganic salt is lithium hexafluoroarsenate and the concentration of the salt in the electrolytic solution ranges from about 1 molar to about 3 molar.
6. The battery of claim 1 in which the light metal anode is lithium, and the electrolytic solution is propylene carbonate containing lithium perchlorate.
7. The battery of claim 1 wherein the organic solvent is methyl formate.
8. The battery of claim 7 wherein the organic salt is lithium hexafluoroarsenate.

* * * * *